(12) United States Patent
Broadway

(10) Patent No.: US 6,178,685 B1
(45) Date of Patent: Jan. 30, 2001

(54) FISHING ROD AND HOLDER APPARATUS

(76) Inventor: David Broadway, 5764-C Mills Rd., Columbia, SC (US) 29206

( * ) Notice: Under 35 U.S.C. 154(b), the term of this patent shall be extended for 0 days.

(21) Appl. No.: 09/394,370

(22) Filed: Sep. 10, 1999

(51) Int. Cl.$^7$ ............................................. A01K 87/00
(52) U.S. Cl. .................... 43/18.1; 43/21.2; 43/25
(58) Field of Search .................. 43/18.1, 21.2, 43/25, 25.2

(56) References Cited

U.S. PATENT DOCUMENTS

| | | | |
|---|---|---|---|
| 1,465,707 | * | 8/1923 | Bartholomew ..................... 43/18.1 |
| 3,992,799 | * | 11/1976 | Oakes ..................................... 43/25 |
| 4,003,153 | * | 1/1977 | Khalil ..................................... 43/25 |
| 4,265,046 | * | 5/1981 | Keith ................................... 43/21.2 |
| 4,707,892 | * | 11/1987 | Nelson ................................ 43/25.2 |
| 4,845,879 | * | 7/1989 | Urso ................................... 43/18.1 |
| 5,214,874 | * | 6/1993 | Faulkner ............................ 43/25.2 |
| 5,444,934 | * | 8/1995 | LaTouche .......................... 43/18.1 |
| 5,586,404 | * | 12/1996 | Freitas ................................ 43/21.2 |
| 5,794,375 | * | 8/1998 | Wright .................................... 43/25 |
| 5,950,346 | * | 9/1999 | Da Rosa ............................. 43/21.2 |
| 6,021,597 | * | 2/2000 | Lajoie ..................................... 43/25 |

FOREIGN PATENT DOCUMENTS

| | | | | |
|---|---|---|---|---|
| 131288 | * | 4/1951 | (CH) | ..................... 43/18.1 |
| 680762 | * | 11/1992 | (CH) | ..................... 43/18.1 |
| 770371 | * | 3/1957 | (GB) | ..................... 43/18.1 |
| 1584864 | * | 8/1990 | (SU) | ..................... 43/21.2 |

WO 96/03035 * 2/1996 (WO) .

* cited by examiner

*Primary Examiner*—Darren W. Ark

(57) ABSTRACT

A fishing rod having an integrally formed receptacle for receiving a remote portion of the fishing rod, when the fishing rod is in a disassembled state. The receptacle is positioned adjacent the handle member of the rod, and is used to receive one end of a remote portion of a fishing rod. The remote portion of the rod is then secured in parallel relation with the base portion of the rod, to facilitate transport and storage. In an alternate embodiment, a detachable rod holder may be mounted onto the base portion of the fishing rod, to accomplish the same task. The detachable rod holder may be attached in one of several places, including attachment underneath the set screw that holds the rod and reel together, or it may be attached by sandwiching the attachment tab between the rod and reel. A stay clip may be used near an upper end of the base portion of the rod, to secure that end of the base portion to the outer end of the remote portion. The rod holder itself holds the base portion and the remote portion of the rod in parallel relation, but the stay clip is an option to further secure the portions with relation to each other. In a preferred embodiment, the stay clip is integrally formed on the base portion of the rod, toward the upper tip opposite the handle member, and includes a clip for attaching the remote portion removably thereto. Alternatively, the stay clip may be removably secured to both the base portion and the remote portion of the rod, which allows the stay clip to be completely removed from the rod when the stay clip is not in use.

3 Claims, 2 Drawing Sheets

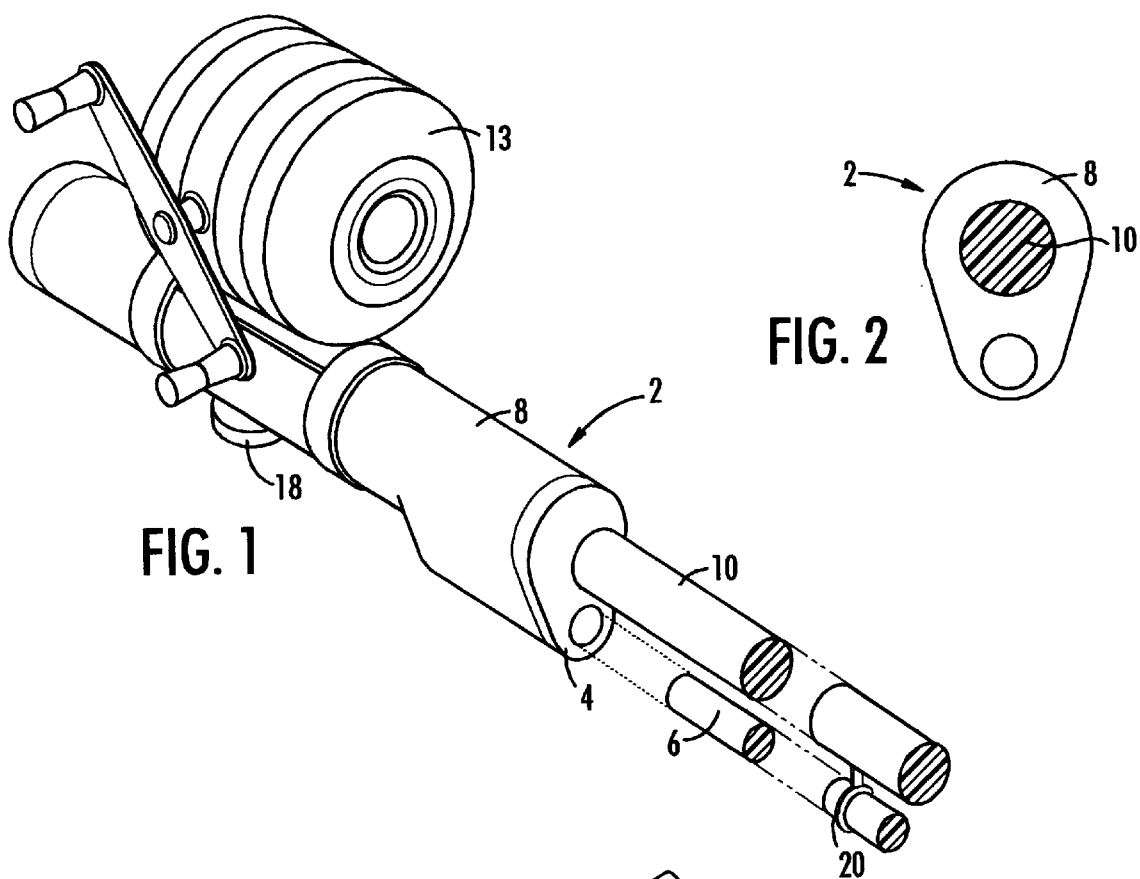
FIG. 1
FIG. 2
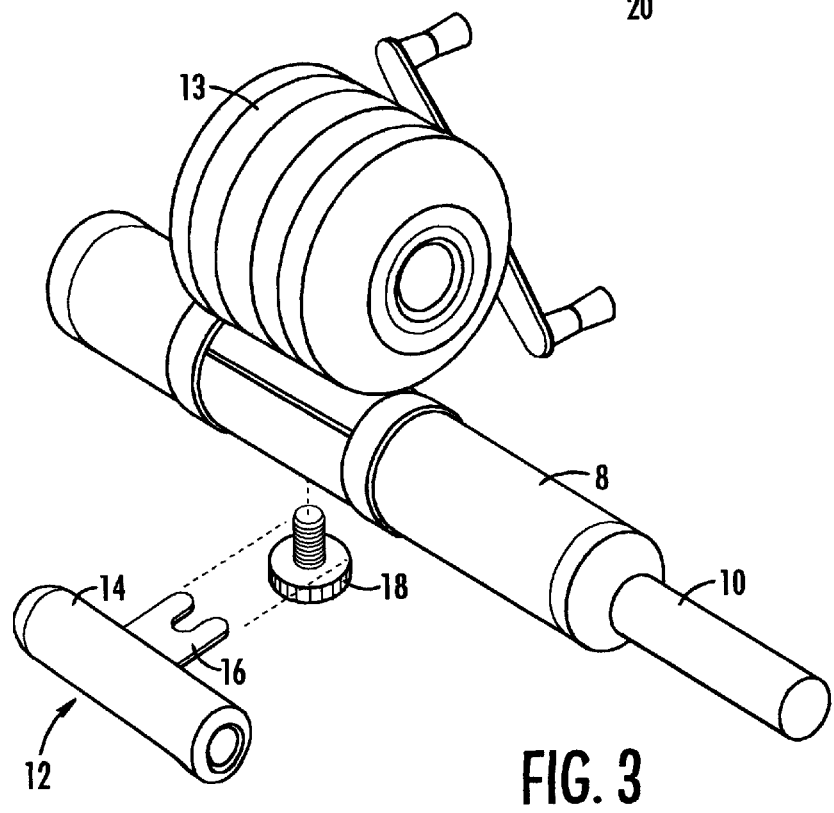
FIG. 3

FISHING ROD AND HOLDER APPARATUS

BACKGROUND OF THE INVENTION

1. Field of the Invention

The invention described and claimed herein relates generally to fishing rods and accessories. More specifically, the present invention allows a fishing rod to be broken down into two parts, where the base portion and the remote portion of the rod may be secured, stored and transported in a compact, secure and organized fashion. Many types of fishing rods are made to be broken down into two parts, generally because fishing rods are difficult to transport and store due to their long length. A long fishing rod may not fit into the trunk of a car, whereas a disassembled rod will likely fit into the trunk of an automobile. One problem associated with these types of fishing rods is that they do not include means for keeping and securing the remote portion of the rod together with the base portion. When the fishing rods are disassembled, there are two separate pieces that need to be transported or stored. Without any means for attaching one portion of the rod to the other, transport becomes more difficult, and storage is inefficient.

Therefore, it would be desirable to provide a rod holder that would allow a remote portion of a fishing rod to be removably secured adjacent to the base portion of the rod, in generally parallel relation. This arrangement facilitates transfer and storage of the disassembled fishing rod.

2. Discussion of the Prior Art

U.S. Pat. No. 3,992,799, issued to Oakes, is directed to an apparatus for use in releasably fastening together in substantially parallel relation a plurality of fishing rod sections. The apparatus comprises a support member provided with a pair of sockets arranged for receiving the butt of the handle section and the male ferrule of the tip section of the rod.

U.S. Pat. No. 4,265,046, issued to Keith, discloses a rod holder device useful in combination with a plural section fishing rod for holding at least one of the rod sections in substantially parallel relation to the main body of the fishing rod. The device is used for storing and transporting a plural section fishing rod in its taken apart condition, and is integrally mounted on the fishing rod handle. The rod holder device comprises a receiver body movably attached to the fishing rod as by a pivot pin, and the receiver body is movable between first and second positions defining a closed and opened condition, respectively. A receiver aperture, for receiving the male end of the rod section, is formed in the receiver body and is operatively disposed when the device is in its second position.

U.S. Pat. No. 4,707,892, issued to Nelson, teaches a clamping device for securing the elements of a fishing pole, once the extensions have been taken apart.

U.S. Pat. No. 5,214,874, issued to Faulkner, is directed to a holder for temporarily fastening an article to a fishing rod or the like, including a plurality of strap-like pliable members which are fastened together by one or more elastic elements. The holders are adapted to be wrapped around the foregrip of a fishing rod and held in place by a plurality of hooks and loops.

U.S. Pat. No. 5,586,404, issued to Freitas, teaches a device for storing and carrying sections of a fishing rod, including an elongated central member with a substantially rectangular cross section and having a pair of pole catches, where the central member also includes a tackle box for carrying a lure or hook.

U.S. Pat. No. 5,794,375, issued to Wright, discloses a pair of fishing rod retainers for storing and transporting a disassembled fishing rod in a compact manner where each of the disassembled sections are placed adjacent and parallel to the main section. A pair of retainers is included, where one retainer is permanently attached to each end of the main section of the fishing rod.

SUMMARY OF THE INVENTION

Accordingly, it is an important object of the present invention to provide a device that may be attached to existing fishing rods to hold a remote portion of the rod in parallel relation to the base portion of the rod for transportation and storage purposes.

Another important object of the present invention is to provide a fishing rod holding device that may be attached to a plurality of places on an existing fishing rod. Specifically, the present device may be attached between the rod and the reel, or may be attached directly under the set screw that is used to attach the rod to the reel.

Still another important object of the present invention is to provide a fishing rod having the capability to secure a remote portion of the fishing rod in parallel relation to the base of the rod, by including an integrally formed receiving member adjacent the handle on the base member to receive the remote portion of the rod therein.

Another important object of the present invention is to provide a fishing rod holder that is easy and inexpensive to manufacture, and which overcomes some of the problems associated with other types of fishing rod holders. These and other objects of the present invention will become apparent with a reading of the following specification, the drawings, and the appended claims.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view of the fishing rod having an integrally formed receptacle for receiving a remote portion of the fishing rod, and a clip for holding the remote ends of the disassembled rod together;

FIG. 2 is a direct front view of the fishing rod and holder shown in FIG. 1;

FIG. 3 is a perspective view of a fishing rod having a detachable rod holder mounted adjacent the set screw used to attach the reel to the fishing rod;

DESCRIPTION OF THE PREFERRED EMBODIMENT

Figure 4:
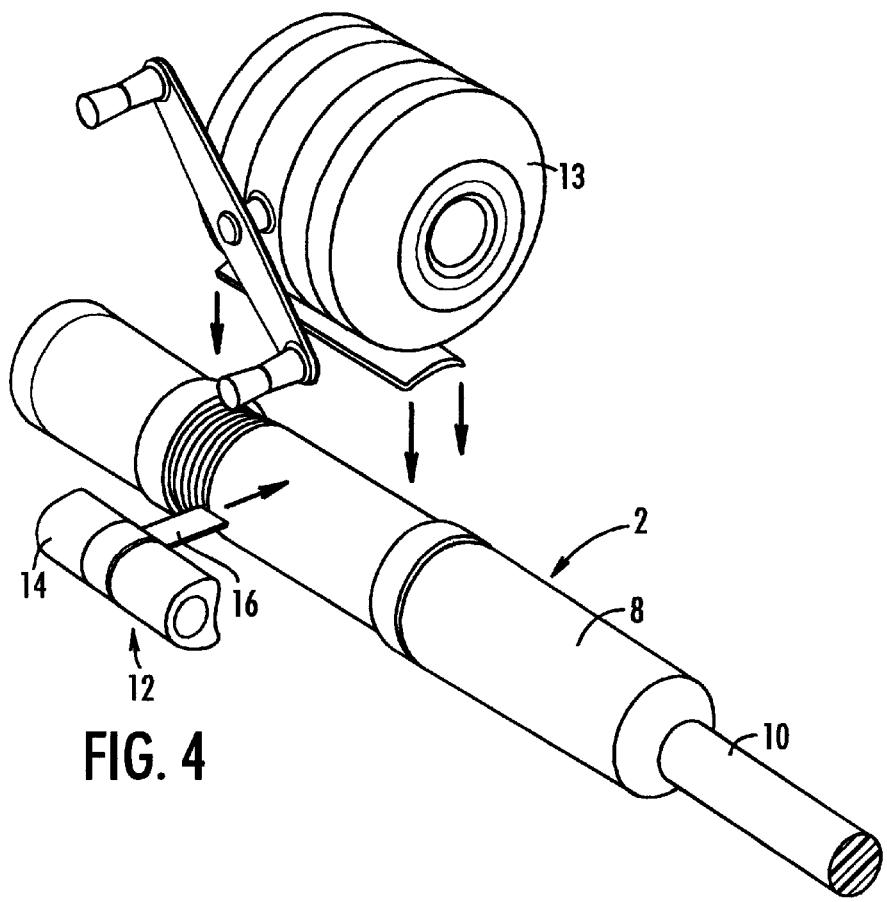
FIG. 4 is a perspective view of a fishing rod having a detachable rod holder mounted between the rod and the reel.

FIG. 1 illustrates a fishing rod 2 having an integrally formed receptacle 4 for receiving a remote portion of the fishing rod 6, when the fishing rod is in a disassembled state. In this embodiment of the invention, the integrally formed receptacle is positioned adjacent the handle member 8 of the fishing rod. The receptacle is a female holding tube that receives a lower end of the remote portion of the fishing rod, when the remote portion of the rod is removed from the base portion 10 of the rod. This receptacle is disposed so that the remote end of a fishing rod will be positioned parallel to the base member of the fishing rod, when the receptacle is in use. It is to be understood that the receptacle may be formed anywhere on or adjacent the handle member, as long as it does not interfere with the use of the rod or reel while fishing.

FIG. 2 illustrates the rod and receptacle assembly from a direct frontal view, where the receptacle is positioned directly on the handle member, and runs parallel to the longitudinal axis of the rod.

Figure 6:
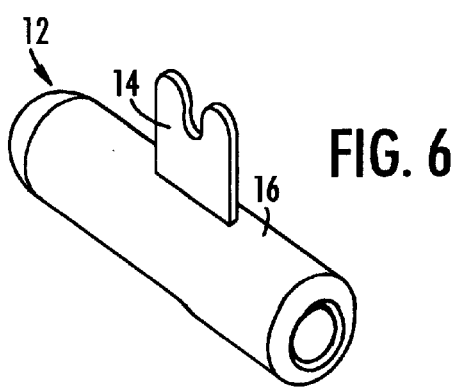
FIG. 6 is a perspective view of the detachable rod holder having a U-shaped tab member as an attachment means.

FIG. 3 is a perspective view of an alternate embodiment of the present invention, showing a fishing rod having a detachable rod holder 12 mounted adjacent the set screw 18 used to attach the reel 13 to the fishing rod. In this embodiment, the detachable rod holder 12, as shown in FIG. 6, comprises a main body member 14 and attachment means in the form of a tab 16. The tab may be U-shaped, so that the set screw located on the rod may be used to attach the detachable rod holder thereto. The two fingers of the U-shaped tab 16 slide along either side of the loosened screw 18 beneath the head of the screw, so that when the screw is tightened onto the rod, the tab 16 and rod holder 12 are held firmly in place. In this embodiment, the detachable rod holder is attached by sliding the U-shaped tab under the set screw and then tightening the screw.

FIG. 4 is a perspective view of a fishing rod having a detachable rod holder mounted between the rod and the reel. This is an alternate method of attaching the detachable rod holder, and the tab used for attachment is generally in the shape of a solid square or rectangle. In this embodiment, the detachable rod holder is attached by loosening the rod from the reel, and sliding the tab between the rod and reel. Then, the reel is tightened back down onto the rod, thereby sandwiching the tab for the detachable rod holder therebetween. A groove may be cut along an outer longitudinal axis of the detachable rod holder, to form a snug union between the detachable rod holder and the base of the rod handle, in the position shown in FIG. 4.

Figure 5:
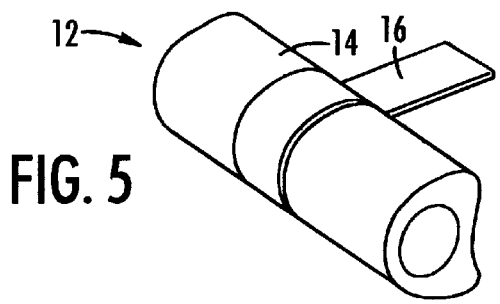
FIG. 5 is a perspective view of the detachable rod holder having a tab member as an attachment means.

FIG. 5 is a perspective view of the detachable rod holder having a tab member as an attachment means. The tab member may be integrally formed with the main body member of the detachable rod holder, or it may be made separately and attached to the main body member by any suitable means, as shown in FIG. 5. In a preferred embodiment, the detachable rod holder is made from a strong and lightweight material, such as plastic. It is to be understood, however, that any suitable material may be used to manufacture the detachable rod holder.

FIG. 6 shows a slight variation from FIG. 5, where the tab member is formed integrally with the main body member, and the tab is U-shaped for attachment using the set screw on a standard type of fishing rod.

Each embodiment of the present invention allows both elements of a disassembled fishing rod to be held together in parallel relation. This arrangement provides a convenient and reliable means of securing, transporting and storing a fishing rod in its disassembled state. Further, the present apparatus prevents fishing line from becoming tangled about the disassembled portions of the rod, which is a frequent problem on rods that have no means for securement in a broken down state.

A stay clip 20 may be used near an upper end of the base portion of the rod, to secure that end of the base portion to the outer end of the remote portion. The rod holder itself holds the base portion and the remote portion of the rod in parallel relation, but the stay clip is an option to further secure the portions with relation to each other. In a preferred embodiment, the stay clip is integrally formed on the base portion of the rod (as shown in FIG. 1), toward the upper tip opposite the handle member, and includes a clip for attaching the remote portion removably thereto. Alternatively, the stay clip may be removably secured to both the base portion and the remote portion of the rod, which allows the stay clip to be completely removed from the rod when the stay clip is not in use.

While a preferred embodiment of the invention has been described using specific terms, such description is for illustrative purposes only, and it is to be understood that changes and variations may be made without departing from the spirit or scope of the following claims.

What is claimed is:

1. A fishing rod capable of securing components of the fishing rod adjacent and generally parallel to one another in a disassembled state, said fishing rod comprising:

a first rod component with first and second ends;

a second rod component with first and second ends, said second rod component being removably securable to said first rod component to form said fishing rod;

said first rod component comprising a butt grip at the first end of said first rod component, a reel seat, a foregrip, a rod extending from the foregrip at the second end of said first rod component, and a receptacle comprising a tube for receiving the first end of said second rod component, the tube being formed integrally with the foregrip and having a longitudinal axis which is non-coincident and parallel with a longitudinal axis of said first rod component;

wherein the second rod component may be removably secured in substantially parallel relation to the first rod component for transportation or storage.

2. The fishing rod set forth in claim 1, further including a stay clip located on said rod, wherein said stay clip may receive a portion of said second rod component of said fishing rod for further support.

3. The fishing rod set forth in claim 2, wherein said stay clip is integrally formed on said rod.

* * * * *